United States Patent
Fujioka

(10) Patent No.: US 7,100,435 B2
(45) Date of Patent: *Sep. 5, 2006

(54) TIRE PRESSURE GAUGE

(75) Inventor: Juzo Fujioka, Hyogo-ken (JP)

(73) Assignees: Kabushiki Kaisha Piyo, Kobe (JP); G.H. Meiser & Co., Posen, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,534

(22) Filed: Nov. 16, 2004

(65) Prior Publication Data

US 2005/0098081 A1    May 12, 2005

Related U.S. Application Data

(63) Continuation of application No. 10/378,246, filed on Mar. 3, 2003, now Pat. No. 6,826,508.

(30) Foreign Application Priority Data

Oct. 31, 2002    (JP) ............................. 2002-317307

(51) Int. Cl.
*E01C 23/00* (2006.01)

(52) U.S. Cl. ....................................... 73/146

(58) Field of Classification Search ................ 434/157; 704/500; 364/558, 565; 702/138, 140; 73/146.5, 146.8, 146
See application file for complete search history.

(56) References Cited

U.S. PATENT DOCUMENTS

| | | | |
|---|---|---|---|
| 2,445,731 A | 7/1948 | Jaycox | |
| 4,250,759 A | 2/1981 | Vago et al. | |
| 4,281,388 A * | 7/1981 | Friend et al. | ............... 702/146 |
| 4,401,971 A | 8/1983 | Saito et al. | |
| 4,748,845 A | 6/1988 | Rocco et al. | |
| 4,998,438 A | 3/1991 | Martin | |
| 5,168,751 A | 12/1992 | Hwang | |
| 5,339,683 A | 8/1994 | Huang | |
| 5,394,343 A * | 2/1995 | Tsao | ........................... 702/140 |
| 5,429,166 A | 7/1995 | Anzai et al. | |
| 5,606,123 A | 2/1997 | Rabizadeh | |
| 5,625,144 A | 4/1997 | Chang | |
| 5,868,576 A * | 2/1999 | Maruta | ....................... 434/157 |
| 5,883,306 A | 3/1999 | Hwang | |

(Continued)

FOREIGN PATENT DOCUMENTS

JP    3068608    5/2000

OTHER PUBLICATIONS www.accu-gage.com/DT141.htm (2 pages).

*Primary Examiner*—Jewel V. Thompson
(74) *Attorney, Agent, or Firm*—Marshall, Gerstein & Borun LLP

(57) ABSTRACT

A portable tire pressure gauge measures a value of tire pressure. The gauge may display the measured value digitally and may output the measured value aurally. The tire pressure gauge may also aurally output a verbal message warning the operator if the measured value approaches a limit value, e.g., if the measured value is below a lower limit or above an upper limit. The limit values, or range of acceptable pressure values, may be set by the user and stored in the gauge. Further, a voice selection switch may be used to selectively turn on and off the voice output warning. Further still, in some examples, the voice warning may be provided in one of multiple foreign languages using the voice selection switch.

23 Claims, 3 Drawing Sheets

U.S. PATENT DOCUMENTS

| | | |
|---|---|---|
| 5,908,984 A | 6/1999 | Chuang |
| 5,952,568 A | 9/1999 | Bedell, Jr. |
| 6,009,749 A | 1/2000 | Huang |
| 6,166,649 A | 12/2000 | Inoue |
| 6,169,854 B1 * | 1/2001 | Hasegawa et al. ............ 396/56 |
| 6,385,554 B1 * | 5/2002 | Wu ............................ 702/140 |
| 6,516,659 B1 | 2/2003 | Chen |
| 6,722,193 B1 | 4/2004 | Conway |
| 6,826,508 B1 * | 11/2004 | Fujioka ...................... 702/138 |
| 6,901,368 B1 * | 5/2005 | Ono ........................... 704/500 |
| 2001/0002552 A1 | 6/2001 | Vinci |
| 2002/0005066 A1 | 1/2002 | Tanner et al. |
| 2004/0154403 A1 | 8/2004 | Petrucelli |

* cited by examiner

TIRE PRESSURE GAUGE

CROSS-REFERENCE TO RELATED APPLICATION

This is a Continuation of U.S. application Ser. No. 10/378,246, filed on Mar. 3, 2003 now U.S. Pat. No. 6,826,508.

BACKGROUND OF THE INVENTION

1. Field of the Invention

The present invention relates to a tire pressure gauge. In particular, the invention relates to a tire pressure gauge that digitally displays and aurally outputs the value of pressure measured by it.

2. Description of the Related Art

There are a variety of conventional tire pressure gauges that digitally display the values of pressure measured by them. A prior art tire pressure gauge displays and aurally outputs the value of pressure measured by it. For example, Japanese Utility Model Registration No. 3,068,608 and U.S. Pat. No. 6,385,554 may be referred to.

However, there has been no tire pressure gauge capable of measuring the tire pressure of a bicycle, a car or the like, digitally displaying the measured value in predetermined units of pressure and aurally outputting the value in different languages.

In general, the tire pressure of bicycles is high and ranges from about 1 $kg/cm^2$ to about 8 $kg/cm^2$, while the tire pressure of cars is low and about a half of that of bicycles. The air valves particularly of bicycle tires differ in size between the American and French types and among different countries. Accordingly, various tire pressure gauges are required for different valve sizes and different pressure ranges.

Various types of bicycle tires and car tires have different ranges of optimum pressure. In general, if a vehicle runs with its tires low in pressure, both sides of the outer peripheral surface of each tire wear out due to their friction against the road surface. This affects the life of the tire. In particular, if a car runs at high speed with its tires low in pressure, they heat up to dangerous temperatures. If a vehicle runs with its tires too high in pressure, only the midsection of the peripheral surface of each tire contacts with the road surface and abnormally wears out.

Accordingly, different ranges of optimum tire pressure are set for bicycles and cars, which are vehicles having tires. The tire pressure of each vehicle having tires needs to be checked at regular intervals according to the condition under which the vehicle is used.

Recent industrial globalization causes many cars and bicycles made in foreign countries to be imported. Some tire pressure gauges are imported, and others are exported. In general, tire pressure gauges for use in each country display values of tire pressure in the units of pressure used there, and aurally output them in the language or one of the languages of the country. The tire pressure gauges that aurally output values of pressure in only one language are inconvenient in a country where two or more languages are spoken.

SUMMARY OF THE INVENTION

In view of the foregoing problems, the object of the present invention is to provide a portable tire pressure gauge for measuring a value of tire pressure, the gauge being able to display the measured value digitally and selectively in one of different units of pressure and output the measured value aurally and selectively in one of different languages.

According to a first aspect of the present invention, there is provided a tire pressure gauge for measuring a value of tire pressure, the gauge comprising a display for displaying the measured value, an audio output unit for aurally outputting the measured value in one of different languages, and a power supply for measurement and display. This gauge can output the measured value of tire pressure aurally in a desired language and be operated even by a person having bad eyes.

The different languages may be the language of a country and a first foreign language in the country. The gauge may further comprise a voice output switch for switching on or off voice output and a language selection switch for selecting one of these two languages. The gauge can output the measured value aurally and selectively in one of the language of the country and the first foreign language, which many people in the country speak or understand.

The language of the country and the first foreign language may be English and Spanish, respectively, which many people in the United States understand.

The audio output unit may output the measured value of tire pressure as displayed on the display. If the measured value approaches a limit value stored in an arithmetic circuitry, this output unit may also output an audio warning. In this case, if the measured value is so low that the tire needs to be supplied with air, the tire pressure gauge can output an audio warning, which reminds the gauge user to supply the tire with air.

If the power supply is a solar battery, there is no need to carry a battery about together with the tire pressure gauge. This makes the gauge portable.

According to a second aspect of the present invention, there is provided a tire pressure gauge comprising a chuck for engaging with the air valve of a tire, a detector for detecting a value of tire pressure, a display for displaying the detected value, a unit selection switch for selecting the units of pressure in which the detected value is displayed, an arithmetic circuitry for converting the detected value into a value in the selected units, an audio output unit for aurally outputting the detected value in one of different languages, and a power supply for measurement and display. This gauge can measure tire pressure in various units of pressure.

The display of this gauge may be digital. The gauge may further comprise an illuminator for illuminating the digital display to make sure that the detected value of tire pressure is visible.

The units of pressure may be "psi", "bar", "$kg/cm^2$" or "kPa" so that the detected value of tire pressure can be displayed in the units of pressure that the gauge user understands most easily.

The different languages in which this gauge can aurally output the detected value may be the language of a country and a first foreign language in the country. The gauge may further comprise a voice output switch for switching on or off voice output and a language selection switch for selecting one of these two languages. The gauge can output the detected value aurally and selectively in one of the language of the country and the first foreign language, which many people in the country speak. The gauge can also output the value aurally in the units of pressure that the gauge user understands most easily. This enables many people in the country to understand the gauge.

The language of the country and the first foreign language may be English and Spanish, respectively. This enables the gauge to output the detected value of tire pressure in the units of pressure that the people living in the United States understand most easily. The audio output unit may output the detected value of tire pressure as displayed on the display. If the detected value approaches a limit value stored in the arithmetic circuitry, this output unit may also output an audio warning. In this case, if the detected value is so low that the tire needs to be supplied with air, the tire pressure gauge can output an audio warning in the units of pressure that the gauge user understands most easily. The warning reminds the user to supply the tire with air.

In accordance with another example of the present invention, there is provided a tire pressure gauge for measuring a value of a tire pressure, where the gauge may aurally output a message warning the operator if the measured value approaches a predetermined limit value. For example, if the measured value is below a lower limit value, the message may speak that the tire pressure is too low. Likewise, if the measured value is higher than the upper limit value, the gauge may speak a warning that the tire pressure is too high. The value or values at which the operator is warned may be set by the user. In some examples, a voice selection switch may be turned to select voice output or no voice output. In some further examples, the voice selection switch may also be used to select a voice output in one of multiple languages, such as a first foreign language or a second foreign language.

In accordance with another example, provided is a method of indicating tire pressure, the method comprising: detecting a tire pressure from a chuck engageable with an air valve of a tire; measuring the tire pressure from the detection of the tire pressure; displaying the measured tire pressure; determining if the measured tire pressure is outside a limit value; and aurally outputting a warning voice message, if the measured tire pressure is outside the limit value.

DETAILED DESCRIPTION OF PREFERRED EMBODIMENTS

Embodiments of the present invention are described below with reference to the accompanying drawings.

Figure 1:
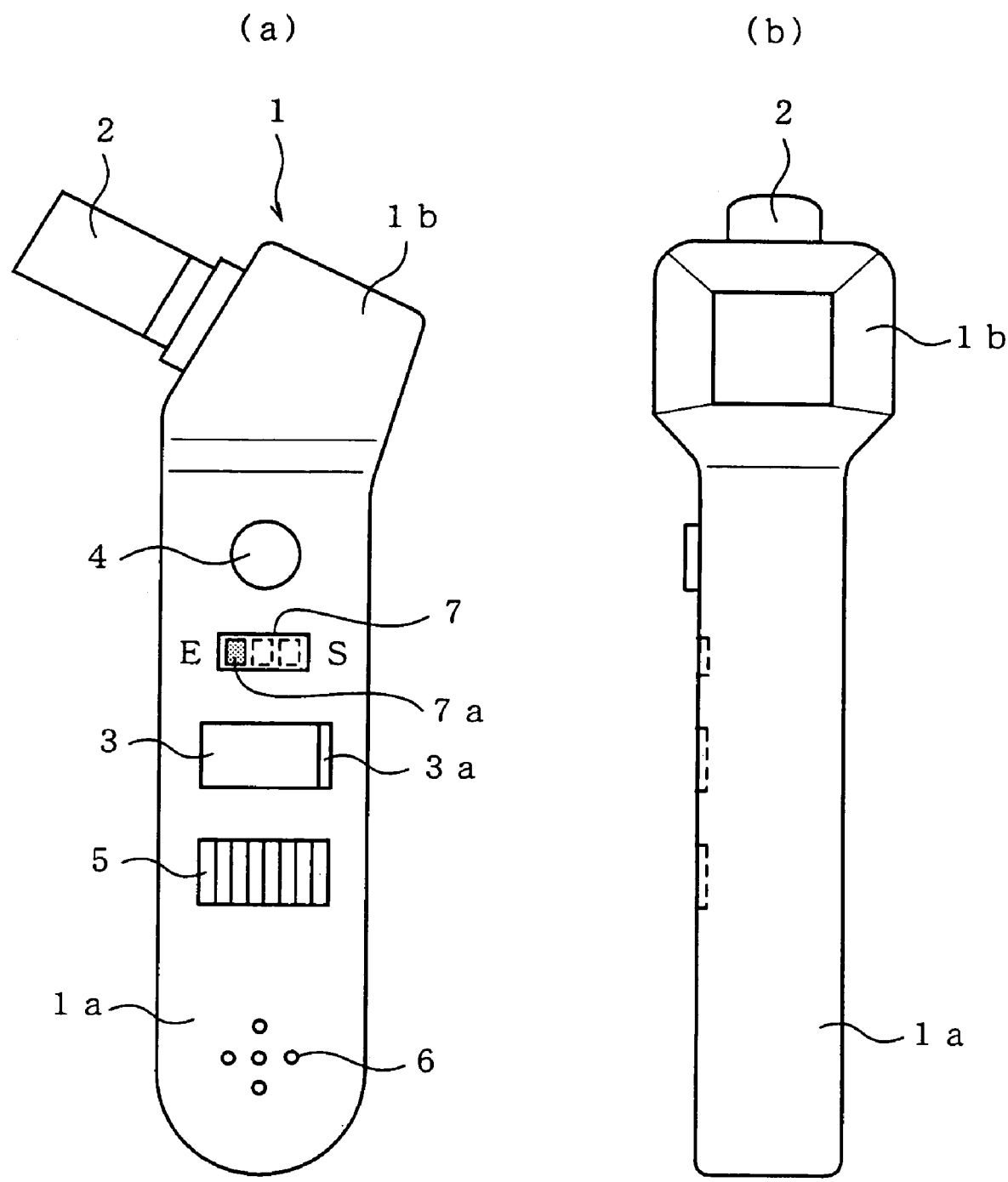
FIG. 1(a) is a side view of a tire pressure gauge according to a first embodiment of the present invention.
FIG. 1(b) is a back view of the gauge shown in FIG. 1(a).

FIGS. 1(a) and 1(b) show a tire pressure gauge 1, which consists of a main body 1a in the form of a rectangular parallelepiped and an inclined head 1b at the top of the body 1a. The head 1b has a chuck 2 that can engage with the air valve of a tire.

As shown in FIG. 1(a), the gauge body 1a is fitted with a liquid crystal display 3, a power/unit switch 4, a solar battery 5 and a voice selection switch 7 on its left side. A lower portion of the gauge body 1a is fitted with an audio output unit 6.

The gauge 1 is lightweight, small, long and narrow or slender so as to be easy to hold in one hand. It is accordingly easy to measure the pressure of a tire by holding the gauge body 1a in one hand and forcing the chuck 2 into engagement with the air valve of the tire. The edges and corners of the gauge 1 are rounded so that it can be manipulated easily without injuring the hand holding it.

The display 3 digitally displays the value of pressure measured by the gauge 1. The power/unit switch 4 can be pushed to switch the unit of pressure to "psi", "bar", "kg/cm$^2$" or "kPa" in that order. The switching order might be another order. The gauge 1 can measure every psi, every 0.05 bar, every 0.05 kg/cm$^2$ or every 5 kPa of pressure. The power/unit switch 4 can also be pushed to switch on or off the gauge 1.

The solar battery 5, which is the power supply for driving the gauge 1, supplies power for pressure measurement, output display and voice output.

The power supply for measurement and display might alternatively be a dry battery or another portable battery. However, a solar battery is suitable as the power supply for the gauge 1, because this battery does not need to be replaced, and because the gauge 1 is often used outdoors.

The voice selection switch 7 can be turned to select no voice output, voice output in a first language or voice output in a second language. If the gauge 1 is made for use in a country, the first language for the gauge may be the official language of the country. In this case, the second language for the gauge 1 may be the first foreign language spoken most commonly in the country. For example, if the country is Japan or the United States, the first language may be Japanese or English, respectively, and the second language may be English or Spanish, respectively. Spanish is spoken by Central American immigrants in the United States. The gauge 1 may store the messages specified by a user in two languages.

If the voice selection switch 7 is turned to select voice output in one of the two languages, the gauge 1 aurally outputs, in the selected units of pressure, the value of pressure measured by it. It is preferable that, if the measured value approaches the predetermined lower limit value, the gauge 1 should aurally output a message warning the operator after the value is output. The message may say that the pressure is too low. Likewise, if the measured value is higher than the upper limit value, the gauge 1 might aurally warn that the pressure is too high. The gauge 1 has an IC memory, where the voice data for the messages may be recorded. If the measured value is within sufficiently safe range, only this value may be output aurally. The value or values at which the operator is warned may be set either when the gauge 1 is produced or at the option of the user.

In particular, because the United States has a large area and many highways and roads kept in good repair, cars are usually used as traffic means in the States. In the States, because many drivers usually keep their cars in good condition by themselves, they want tire pressure gauges easy to use.

Accordingly, the gauge 1 has voice output in English and Spanish as the first and second languages respectively. The voice selection switch 7 has a knob 7a, a position E, a position S and a neutral position between the positions E and S. The knob 7a can be turned to the position E, the position S or the neutral position for English, Spanish or no voice output respectively.

The unit of pressure psi is used in the United States and other countries where the units "yard" and "pound" are used. The units of pressure "bar", "kg/cm$^2$" and "kPa" are used in metric countries, where the metric system is used.

While the gauge 1 is measuring the pressure of a tire, with the chuck 2 forced into engagement with the air valve of the tire, the chuck 2 may be sealed with an elastic member (not shown) against air leakage.

Figure 2:
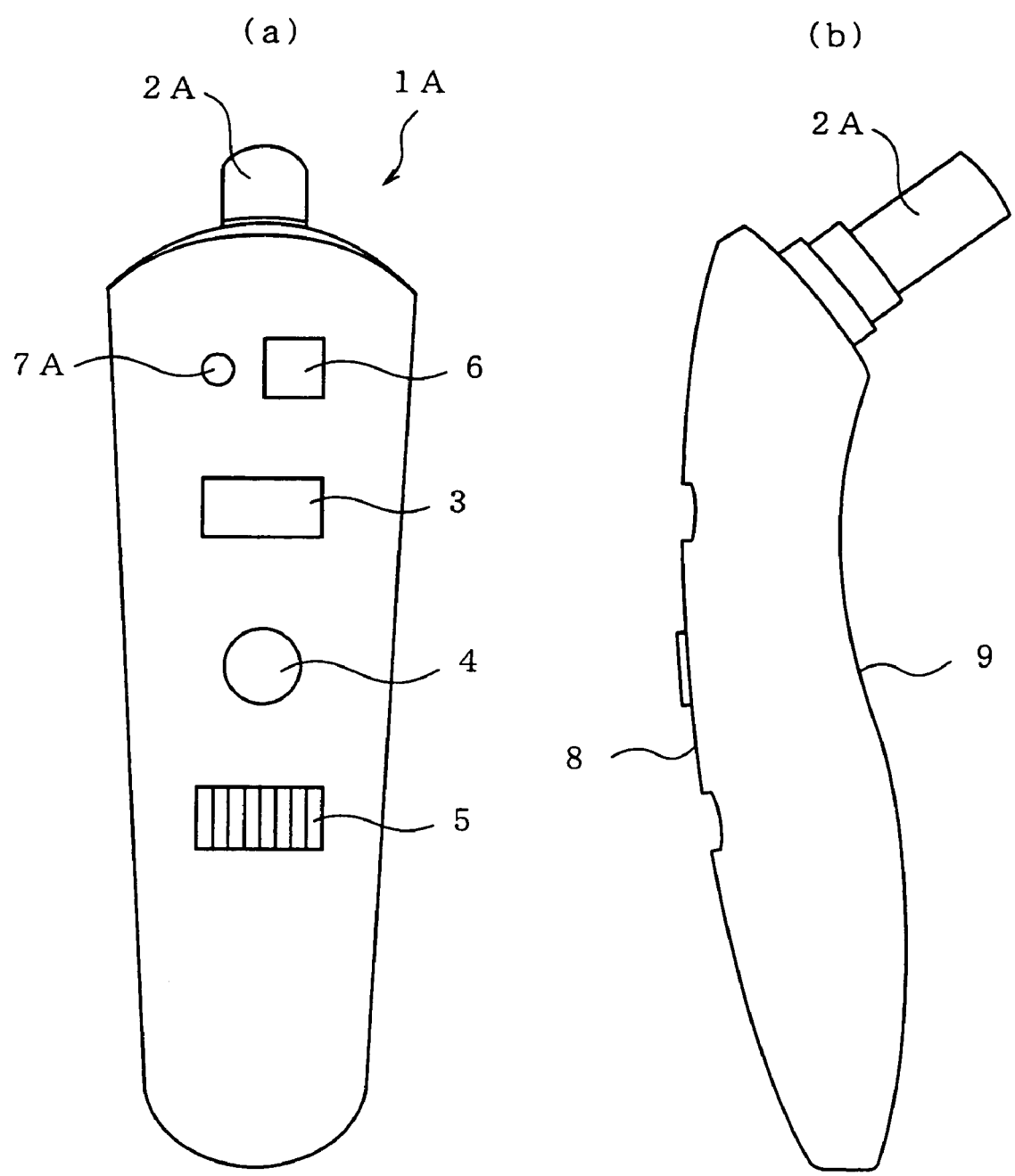
FIG. 2(a) is a back view of a tire pressure gauge according to a second embodiment of the present invention.
FIG. 2(b) is a side view of the gauge shown in FIG. 2(a).

FIGS. 2(a) and 2(b) show another tire pressure gauge 1A, which includes a chuck 2A, a liquid crystal display 3 and a power/unit switch 4. The chuck 2A can engage with the air valve of a bicycle tire as well as the air valve of a car tire. The display 3 displays the value of pressure measured by the gauge 1A. The switch 4 can be pushed to switch the unit of pressure. The body of the gauge 1A has a gently convex front surface 8 and a gently concave back surface 9 so that the body can be held easily in hand.

As is the case with the gauge 1, the gauge 1A is fitted with a solar battery 5, an audio output unit 6 and a voice selection switch 7A.

The voice selection switch 7A can be pushed to select voice output in a first language, voice output in a second language or no voice output.

In general, the air valves of bicycles are classified into the American and French types. It is possible to use the gauge 1A for either of the types by merely changing the assembly of one or more parts of the chuck 2A.

Bicycles have a higher range of tire pressure than cars. The gauge 1A can measure up to 10 kg/cm$^2$, under which the tire pressure of bicycles ranges. The gauge 1A can, with sufficient accuracy, measure even a range from 2 kg/cm$^2$ to 3 kg/cm$^2$, which is the range of car tire pressure. Accordingly, the gauge 1A is common to bicycles and cars.

Figure 3:
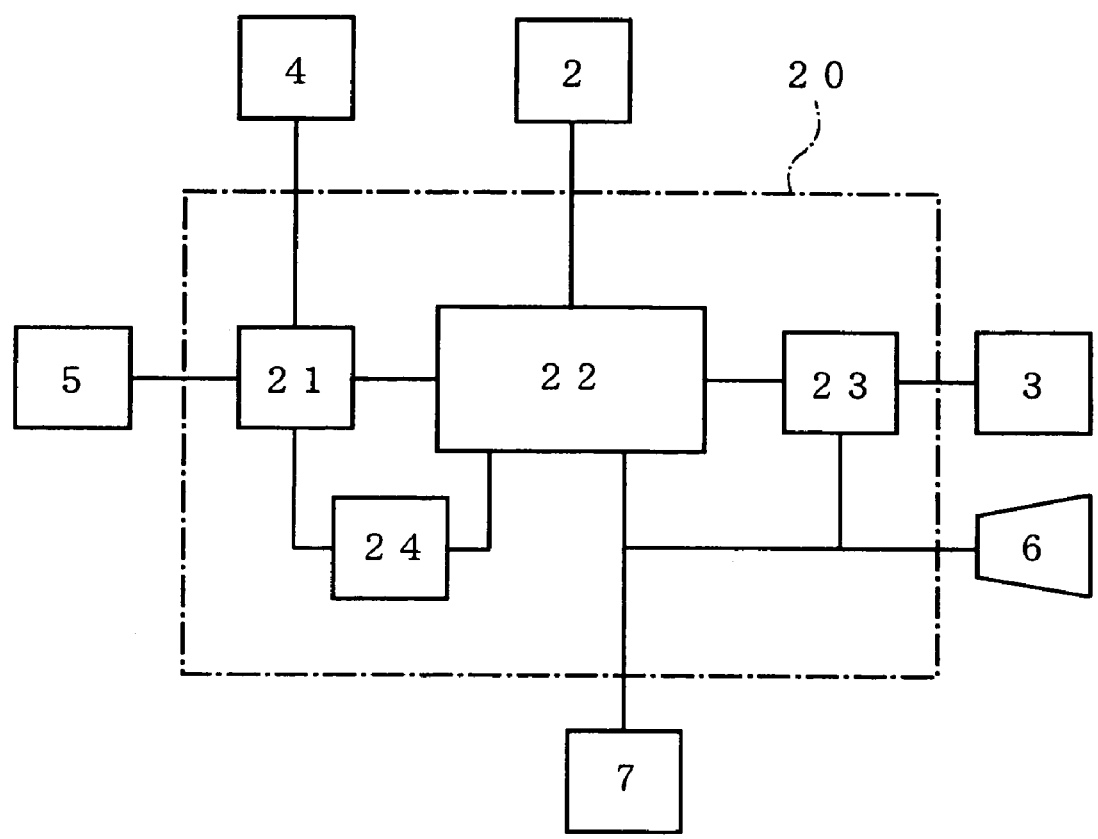
FIG. 3 is a control block diagram of the gauge shown in FIGS. 1(a) and 1(b).

FIG. 3 is a control block diagram of the gauge 1, which includes an electronic board 20. The board 20 is a unit including a power controller 21 for on-off control of the power supply, an arithmetic circuitry 22, a display controller 23 and an internal oscillator 24. The arithmetic circuitry 22 computes, into a value in the units of pressure selected with the switch 4, the electric signal representing the vibration based on the tire pressure detected at the chuck 2. The display controller 23 controls the liquid crystal display 3. By using the electronic board 20, it is possible to accurately measure a range of tire pressure up to 10 kg/cm$^2$ and display the measured value in the various units of pressure.

The solar battery 5 supplies power through the power controller 21 to the arithmetic circuitry 22, the display controller 23 and the internal oscillator 24. The display 3 displays the measured value in the units of pressure selected with the power/unit switch 4. The audio output unit 6 speaks the displayed value, which may be followed by the warning message, in the language selected with the voice selection switch 7.

The display 3 can hold and display the peak value of tire pressure measured by the gauge 1. After the peak value is measured with the chuck 2 forced into engagement with the air valve of a tire, the displayed value can be confirmed on the display 3. If the power/unit switch 4 is pressed for a predetermined time, which may be three seconds, or longer, the displayed value switches automatically to another unit of pressure. The internal oscillator 24 operates to measure the predetermined time.

Another function of the gauges 1 and 1A is zero point correction, which is performed at the same time that the power/unit switch 4 of each gauge is pressed after the gauge is switched on.

A lower limit and an upper limit of tire pressure are set in each of the gauges 1 and 1A. If the gauge 1 or 1A measures a tire pressure under the associated lower limit or over the associated upper limit, the gauge sounds a buzzer, without voice output selected.

Because the power supply of each gauge 1 or 1A is a solar battery, the gauge is portable and easy to carry about for cycling or a drive, and it is possible to check the tire pressure with the gauge as the need arises. This makes it possible to enjoy safe cycling or a safe drive.

The display 3 of each gauge 1 or 1A is fitted with an illuminator 3a, which may be an LED or an electric light bulb, for illuminating it. The gauge 1 or 1A includes a circuit that, when the associated chuck 2 or 2A is forced into engagement with the air valve of a tire, detects the pressure of the tire and applies an electric current to the illuminator 3a so as to light this illuminator. The illuminator 3a makes it easy to read the value on the display 3 even at night or in a dark place. If the illuminator 3a is an LED, it consumes less power and is economical.

What is claimed is:

1. A tire pressure gauge comprising:
   a chuck that is capable of engaging an air valve of a tire to detect tire pressure;
   an arithmetic circuit coupled to the chuck and capable of computing a measured tire pressure value;
   a display for digitally displaying the measured tire pressure value;
   an audio output unit capable of aurally outputting a tire pressure warning voice message, if the measured tire pressure value approaches a limit value stored in the arithmetic circuit.

2. The tire pressure gauge of claim 1, wherein the limit value is a lower limit value, the arithmetic circuit controlling the audio output unit to aurally output the tire pressure warning voice message if the measured tire pressure is below the lower limit value.

3. The tire pressure gauge of claim 1, wherein the limit value is an upper limit value, the arithmetic circuit controlling the audio output unit to aurally output the tire pressure warning voice message if the measured tire pressure is above the upper limit value.

4. The tire pressure gauge of claim 1, further comprising a voice selection switch for selectively switching the audio output unit on and off.

5. The tire pressure gauge of claim 4, wherein the audio output unit is capable of aurally outputting the warning voice message in one of multiple different languages.

6. The tire pressure gauge of claim 5, wherein the multiple different languages comprise a first language that is English and a second language that is Spanish.

7. The tire pressure gauge of claim 4, wherein the display, the audio output unit, and the voice selection switch are all arranged over a narrow body portion of the gauge.

8. The tire pressure gauge of claim 1, further comprising a power supply for measuring and displaying the tire pressure, wherein the power supply is a solar battery.

9. The tire pressure gauge of claim 1, further comprising a unit selection switch provided for selecting the units of pressure in which the detected pressure is measured.

10. The tire pressure gauge of claim 1, further comprising a circuit-readable storage medium for storing a lower limit value and an upper limit value.

11. A method of indicating tire pressure, the method comprising:
    detecting a tire pressure from a chuck engageable with an air valve of a tire;
    measuring the tire pressure from the detection of the tire pressure;
    displaying the measured tire pressure;
    determining if the measured tire pressure is outside a limit value; and
    aurally outputting a warning voice message, if the measured tire pressure is outside the limit value.

12. The method of claim 11, wherein determining if the measured tire pressure is outside of the limit value comprises determining if the measured tire pressure is below a lower limit value.

13. The method of claim 11, wherein determining if the measured tire pressure is outside of the limit value comprises determining if the measured tire pressure is above an upper limit value.

14. The method of claim 11, further comprising selecting to aurally output the warning voice message in one of multiple different languages.

15. The method of claim 14, wherein the multiple different languages comprise a first language that is English and a second language that is Spanish.

16. The method of claims 11, further comprising powering the tire gauge using a solar battery.

17. The method of claim 11, further comprising providing a unit selection switch to select the units of pressure in which the detected pressure is measured.

18. The method of claim 11, further comprising storing a user selected value as the limit value.

19. A tire pressure gauge comprising:
   a chuck that is capable of engaging the air valve of a tire;
   means for detecting tire pressure through the chuck and measuring that pressure in selected measurement units;
   a display for digitally displaying the measured tire pressure;
   an audio output unit for aurally outputting the measured tire pressure in one of multiple different languages;
   a voice selection switch for selecting a language from the multiple different languages and for switching on or off the aural output, wherein the multiple different languages comprise more than two different languages; and
   a power supply for measuring and displaying the tire pressure.

20. The tire pressure gauge of claim 19, wherein the multiple different languages comprise a first language that is English and a second language that is Spanish.

21. A tire pressure gauge comprising:
   a chuck that is capable of engaging an air valve of a tire to detect tire pressure;
   an arithmetic circuit coupled to the chuck and capable of computing a measured tire pressure value;
   a display for digitally displaying the measured tire pressure value;
   an audio output unit capable of aurally outputting the measured tire pressure value in one of multiple different languages;
   a voice selection switch for selecting a language from the multiple different languages and for switching on or off the aural output; and
   a power supply for measuring and displaying the tire pressure.

22. The tire pressure gauge of claim 21, wherein the multiple different languages comprise a first language that is English and a second language that is Spanish.

23. The tire pressure gauge of claim 21, wherein the multiple different languages comprise more than two different languages.

* * * * *

UNITED STATES PATENT AND TRADEMARK OFFICE
CERTIFICATE OF CORRECTION

| | | |
|---|---|---|
| PATENT NO. | : 7,100,435 B2 | |
| APPLICATION NO. | : 10/989534 | |
| DATED | : September 5, 2006 | |
| INVENTOR(S) | : Juzo Fujioka | |

It is certified that error appears in the above-identified patent and that said Letters Patent is hereby corrected as shown below:

In the Title Page:

ITEM (57), please delete the abstract as shown and insert the following: -- A portable tire pressure gauge measures a value of tire pressure. The gauge can display the measured value digitally and selectively in one of different units of pressure. If the gauge is made for use in a country, the gauge can output the measured value aurally and selectively in one of two languages that a majority of people in the country understand. These languages may be the language of the country and a first foreign language in the country. The gauge includes a display, a switch, a solar battery and an audio output unit. The display digitally displays the measured value. The switch switches the different units of pressure. The solar battery is the power supply for measurement and display. The audio output until can output the measured value aurally and selectively in one of the two languages.--

Signed and Sealed this

Sixteenth Day of January, 2007

JON W. DUDAS
*Director of the United States Patent and Trademark Office*